US012251846B2

(12) United States Patent
Peterson, Jr.

(10) Patent No.: US 12,251,846 B2
(45) Date of Patent: *Mar. 18, 2025

(54) SNAP FASTENED DRIVE CAP ASSEMBLY

(71) Applicant: Andis Company, Sturtevant, WI (US)

(72) Inventor: John Harlan Peterson, Jr., Oak Creek, WI (US)

(73) Assignee: Andis Company, Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,462

(22) Filed: Jan. 12, 2024

(65) Prior Publication Data

US 2024/0149478 A1 May 9, 2024

Related U.S. Application Data

(63) Continuation of application No. 17/559,104, filed on Dec. 22, 2021, now Pat. No. 11,904,485, which is a (Continued)

(51) Int. Cl.
*B26B 19/38* (2006.01)
*B26B 19/06* (2006.01)

(52) U.S. Cl.
CPC ........ *B26B 19/3853* (2013.01); *B26B 19/063* (2013.01); *B26B 19/3846* (2013.01); *B26B 19/3873* (2013.01)

(58) Field of Classification Search
None
See application file for complete search history.

(56) References Cited

U.S. PATENT DOCUMENTS 1,956,042 A 4/1934 Oster
2,182,597 A 12/1939 Oster
(Continued)

FOREIGN PATENT DOCUMENTS

CN 101518907 9/2009
CN 106660223 5/2017
(Continued)

OTHER PUBLICATIONS

International Searching Authority, "International Search Report and Written Opinion," issued in connection with International Patent Application No. PCT/US2019/066322, mailed on Apr. 14, 2020, 12 pages.

(Continued)

*Primary Examiner* — Hwei-Siu C Payer
(74) *Attorney, Agent, or Firm* — Reinhart Boerner Van Deuren s.c.

(57) ABSTRACT

A drive cap uses snap fasteners to couple with the housing assembly of a hair clipper. The drive cap uses joining structures to align with the upper and lower housings of the housing assembly. Once correctly aligned, snap fasteners enable a snug fit and enhance the finish of the hair clipper. The snap fasteners can be located on an inner surface of the drive cap, lower housing, and/or upper housing. A snap detent is located on the inner surface of an adjacent surface to receive the snap fastener. A combination of protrusions, extensions, voids, and recesses, in addition to the snap fasteners ensures a secure fit for the drive cap between the upper and lower housings. The snap fasteners couple the drive cap to upper and lower housings seamlessly along the outer surface of the hair clipper and facilitate quick release of the drive cap for maintenance or cleaning.

19 Claims, 8 Drawing Sheets

Related U.S. Application Data continuation of application No. 16/714,126, filed on Dec. 13, 2019, now Pat. No. 11,235,482.

(60) Provisional application No. 62/779,970, filed on Dec. 14, 2018.

(56) References Cited

U.S. PATENT DOCUMENTS

| | | | | |
|---|---|---|---|---|
| 3,407,958 | A | 10/1968 | Konijnenberg et al. | |
| 3,520,059 | A | 7/1970 | Gringer | |
| 3,589,007 | A | 6/1971 | Walton | |
| 4,541,538 | A | 9/1985 | Swetnam | |
| 4,549,352 | A | 10/1985 | Ochiai et al. | |
| 5,088,200 | A | 2/1992 | Piwaron et al. | |
| 5,230,153 | A | 7/1993 | Andis | |
| 6,076,263 | A | 6/2000 | Andis et al. | |
| 6,640,811 | B2 | 11/2003 | Cho | |
| 6,862,810 | B2 | 3/2005 | Braun et al. | |
| 9,561,596 | B2 | 2/2017 | Buck, Jr. | |
| 10,071,491 | B2 | 9/2018 | Kammer et al. | |
| 11,235,482 | B2 | 2/2022 | Peterson, Jr. | |
| 11,904,485 | B2 * | 2/2024 | Peterson, Jr. | B26B 19/3846 |
| 2003/0005585 | A1 | 1/2003 | Rizzuto, Jr. et al. | |
| 2003/0102002 | A1 | 6/2003 | Cho | |
| 2003/0233755 | A1 | 12/2003 | Braun et al. | |
| 2020/0189135 | A1 | 6/2020 | Peterson, Jr. | |
| 2022/0111543 | A1 | 4/2022 | Peterson, Jr. | |
| 2024/0149478 | A1 * | 5/2024 | Peterson, Jr. | B26B 19/3853 |

FOREIGN PATENT DOCUMENTS

| | | |
|---|---|---|
| EP | 2093028 | 8/2009 |
| KR | 200337194 | 12/2003 |
| KR | 20160000150 | 1/2016 |
| WO | WO2015/043354 | 4/2015 |

OTHER PUBLICATIONS

Extended European Search Report for European Application No. 19895608.8, dated Sep. 20, 2022, 7 pages.

Qiu, Gaohe. (2017), “Optimal Design of DC Electric Hair Clipper Crank Slider Mechanism,” Journal of Ningbo Polytechnic, No. 1, Feb. 25, 2017.

* cited by examiner

SNAP FASTENED DRIVE CAP ASSEMBLY

CROSS-REFERENCE TO RELATED PATENT APPLICATIONS

The present application is a continuation of U.S. application Ser. No. 17/559,104, now U.S. Pat. No. 11,904,485, filed Dec. 22, 2021, which is a continuation of U.S. application Ser. No. 16/714,126, now U.S. Pat. No. 11,235,482, filed Dec. 13, 2019, which claims the benefit of and priority to U.S. Provisional Application No. 62/779,970 filed on Dec. 14, 2018, each of which is incorporated herein by reference in its entirety.

BACKGROUND OF THE INVENTION

The invention generally relates to hair clippers, and more specifically, to hair clippers which include an electrically operated motor enclosed within an outer housing assembly and which reciprocates a cutter blade of a cutting blade set through a drive assembly.

SUMMARY OF THE INVENTION

One embodiment of the invention relates to a hair clipper with a housing, a drive assembly, a blade set, and a drive cap. The housing includes an upper housing coupled to a lower housing each having an inner surface. The blade set is coupled to the drive assembly and includes an outer blade and an inner blade that oscillates over the outer blade. The drive cap is coupled to the upper housing with a snap fastener located on the inner surface of the upper housing that removably couples with a snap detent on an inner surface of the drive cap. The drive cap partially surrounding the drive assembly to provide a barrier that prevents debris from entering the drive assembly.

Another embodiment of the invention relates to a cordless hair clipper with an electrical storage device, a drive assembly, a blade assembly, a housing, and a drive cap. The electrical storage device stores electric energy that is supplied to the drive assembly to drive the blade assembly. The blade assembly has an upper blade coupled to the drive assembly; and an outer blade coupled to the upper blade. The drive assembly uses electrical energy from the electrical storage device to oscillate the upper blade over the outer blade. The housing surrounds the electrical storage device and the drive assembly. The housing includes an upper housing comprising an inner surface and an outer surface and a lower housing comprising an inner surface and an outer surface. The lower housing is coupled to the upper housing with one or more snap fasteners. For example, one of the upper or lower housings has a snap fastener on its inner surface and the other housing has a snap detent on its inner surface. The snap fastener and the snap detent on the inner surfaces releasably couple the upper and lower housings. The drive cap also has an inner surface and an outer surface and couples to the upper housing. One of the upper housing and the drive cap has a snap fastener on its inner surface and the other has a snap detent on its inner surface. The snap fastener and the snap detent on the inner surfaces releasably couple the upper housing to the drive cap.

Another embodiment of the invention relates to a cordless hair clipper with a releasable blade assembly. The hair clipper has an electrical storage device to store electric energy, a drive assembly, a blade assembly, a housing, and a drive cap. The drive assembly is coupled to the electrical storage device to power the blade assembly. The blade assembly has an upper blade coupled to the drive assembly; and a stationary outer blade coupled to the upper blade. The drive assembly uses electrical energy from the electrical storage device to oscillate the upper blade over the outer blade. The housing surrounds the electrical storage device and the drive assembly. The housing has an upper housing with an inner surface and an outer surface and a lower housing with an inner surface and an outer surface. The lower housing is coupled to the upper housing with one or more snap fasteners. One of the housings has a snap fastener on its inner surface and the other housing has a snap detent on its inner surface. The snap fastener and the snap detent are coupled on the inner surfaces of the housings to releasably couple the upper housing to the lower housing. The drive cap has an inner surface and an outer surface. One of the upper housing and the drive cap has a snap fastener on its inner surface and the other of the upper housing and the drive cap has a snap detent on its inner surface. The snap fastener and the snap detent on the inner surfaces releasably couple the upper housing to the drive cap.

Another embodiment of the invention relates to a drive cap coupled to the upper housing through a pair of snap fasteners. Snap fasteners enable a snug fit and enhance the fit and finish of the hair clippers. The snap fasteners are located on an inner surface of one of either the drive cap or upper housing assembly. A snap detent is located on the inner surface of the other of either the drive cap or upper housing assembly and is configured to receive the snap fasteners and couple the drive cap to the upper housing seamlessly along the outer surfaces of the drive cap and upper housing. The snap fasteners are easily released allowing for the drive cap to be removed during maintenance or for cleaning.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a drive cap are shown. The drive cap couples to the upper housing and lower housing to create a hair clipper outer body that surrounds the drive assembly. The removable cover or drive cap covers the forward portion of the drive assembly (e.g., motor). Past embodiments of the drive cap interconnect the drive cap to the upper housing or lower housing with fasteners or screws. Fasteners change the look and feel of the hair clipper outer body and require screwdrivers to remove the drive cap. Removing the drive cap is often useful to access the drive assembly for cleaning and maintenance.

Applicant has found that using snap fasteners configured to couple with a detent on the inner sides of the drive cap and upper housing can provide a secure method of coupling the drive cap to the outer body. Snap fasteners create a secure joint that appears seamless on the outer body of the hair clippers. In addition, the joint does not require fasteners or other hardware to remove or replace the drive cap. Various additional lips and protrusions slidably guide and hold the drive cap in position to securely couple the drive cap to the upper housing and lower housing. No additional hardware to join or remove drive cap is used other than snap fasteners and orienting projections and slots. Such an assembly gives a smooth, transition-free appearance to the outer body of the hair clippers.

Figure 1:
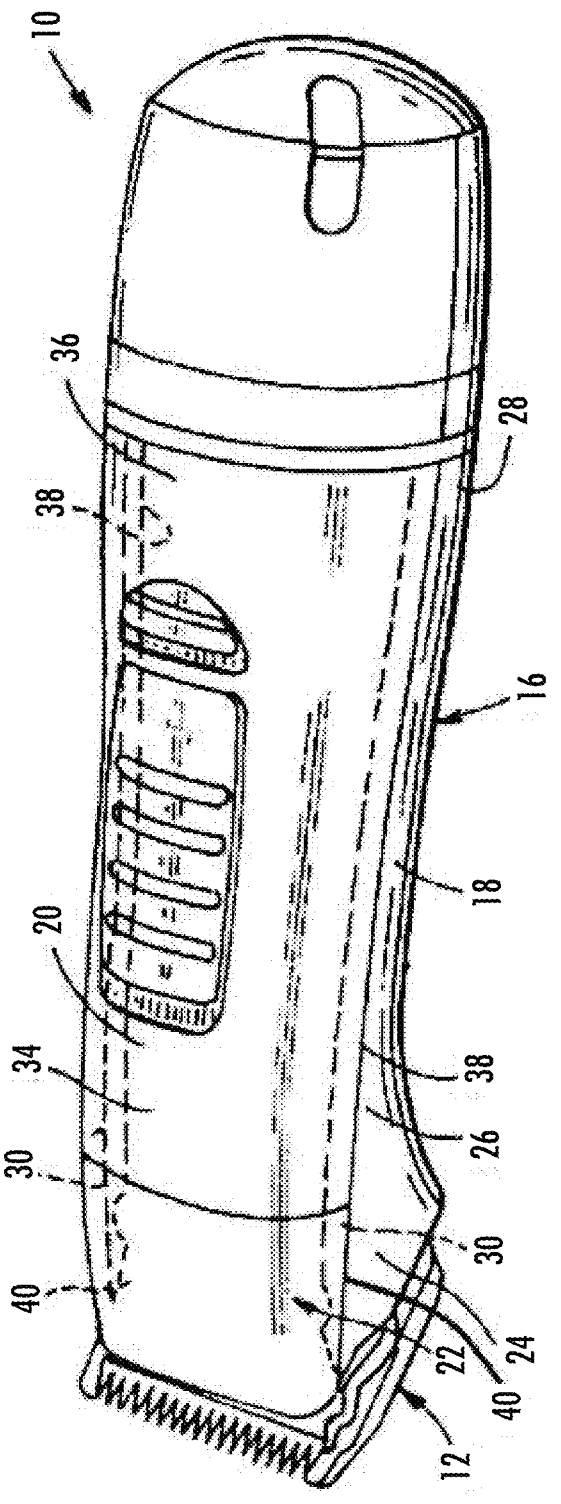
Prior Art FIG. 1
FIG. 1 is a perspective view of a prior art hair clipper with a blade assembly, a lower housing, an upper housing, and a drive cap, according to one embodiment.

FIG. 1 illustrates a prior art hair cutter or clipper 10 comprising a cutting blade set or assembly 12. Blade assembly 12 is driven by a drive assembly 14 (illustrated in FIG. 4). Hair clipper 10 includes a body or an outer body 16 that surrounds drive assembly 14 and is attached to cutting blade assembly 12. Outer body 16 includes a lower housing 18, an upper housing 20, and a removable cover or drive cap 22. Lower and upper housings 18 and 20 and drive cap 22 couple to surround, or partially surround, drive assembly 14 and/or a battery or electrical storage device. Drive cap 22 is located adjacent to blade assembly 12 and in enclosing relation to drive assembly 14. Drive cap 22 partially surrounds drive assembly 14 to provide a barrier that prevents debris from entering drive assembly 14. Lower housing 18, upper housing 20, and drive cap 22 include resilient structures that extend into or from drive cap 22 to removably connect drive cap 22 to outer body 16. Drive cap 22 partially surrounds drive assembly 14 and provides a protective barrier. Removal of drive cap 22 exposes parts of blade assembly 12 and drive assembly 14.

Lower housing 18 and upper housing 20 are coupled through any suitable manner, such as by screws, rivets, spot welds, adhesives, fasteners, or other means. In some embodiments, lower housing 18 couples to upper housing with one or more snap fasteners 50 and/or snap detents 51. In some embodiments, one of lower or upper housing 18 or 20 has snap fastener 50 on an inner surface 33 (e.g., inner surface 33*a* on lower housing 18 or inner surface 33*b* on upper housing 20) and the other of lower or upper housing 18 or 20 has snap detent 51 on the other inner surface 33. Snap fastener 50 and snap detent 51 are coupled on inner surfaces 33 of lower and upper housings 18 and 20 to releasably couple housings 18 and 20. Lower housing 18 and upper housing 20 are elongate shaped and form a semi-cylindrical shape in the direction transverse to the direction of elongation. In some embodiments, outer body 16 and its component parts, are a relatively rigid plastic or another polymer and generally hollow.

Lower housing 18 includes an outer surface 24, an inner surface 33*a*, a forward end 26, and a rearward end 28. Lower housing 18 has lateral edges 30 which extend around the periphery of lower housing 18. Similarly, upper housing 20 includes an outer surface 32, an inner surface 33*b* (FIGS. 3-4 and 6-7) a forward end 34, and a rearward end 36. Upper housing 20 has lateral edges 38 which extend around the periphery of upper housing 20. Lateral edges 38 of upper housing 20 are configured to couple with lateral edges 30 of lower housing 18. Lateral edges 30 of lower housing 18 include respective forward end segments 40 which extend forwardly beyond the forward end 34 of upper housing 20.

Figure 2:
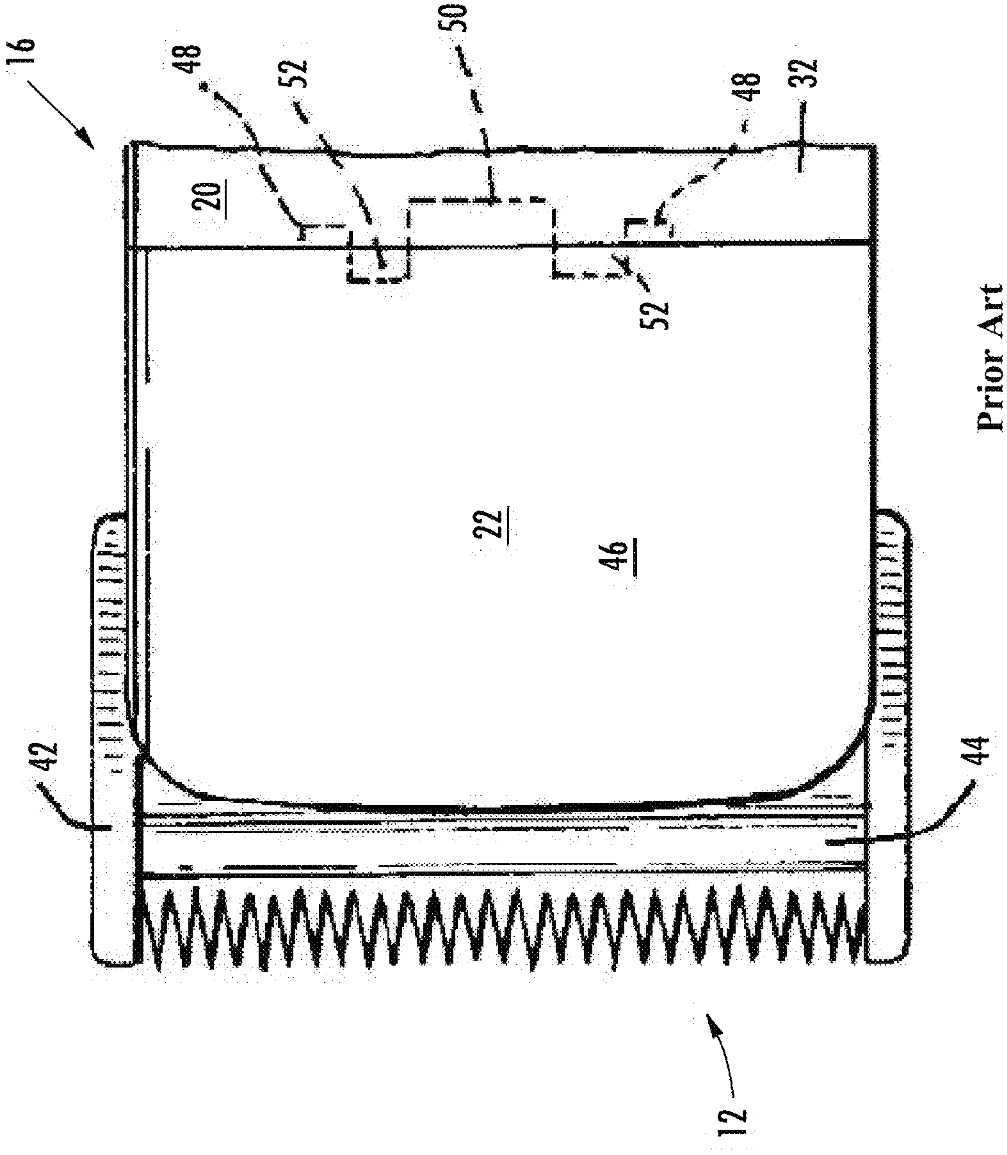
Prior Art FIG. 2
FIG. 2 is a partial top plan view illustrating the coupling of the drive cap to the upper housing of the hair clipper illustrated in FIG. 1.

FIG. 2 illustrates a top view of blade assembly 12 and the connection between drive cap 22 and upper housing 20. Blade assembly 12 includes an outer, lower, or stationary blade 42 and an inner, upper, or translating cutting blade 44. Cutting blade 44 is trapped between stationary blade 42 and the outer body 16. Cutting blade 44 is captured between stationary blade 42 and outer body 16 and reciprocates over stationary blade 42. Drive cap 22 has an inner surface 33*c* and an outer surface 46. As illustrated, drive cap 22 includes protrusions 48 and snap fasteners 50. Upper housing 20 includes two extensions 52 that interconnect upper housing 20 to drive cap 22.

For example, protrusions 48 on drive cap 22 extend into upper housing 20 to releasably engage drive cap 22 under upper housing 20 and orient snap fasteners 50 relative to snap detents 51 on drive cap 22 and/or housing 20 (or housing 18). Protrusions 48, snap fasteners 50, and extensions 52 align drive cap 22 relative to lower and upper housings 18 and 20 and secure drive cap 22 into place. Thus, outer surfaces 24 and 32 of lower and upper housings 18 and 20 are continuous with outer surface 46 of drive cap 22, creating a smooth outer body 16. In this way, a smooth surface along outer body 16 is created without any transitions along lower housing 18, upper housing 20, and/or drive cap 22.

Figure 3:
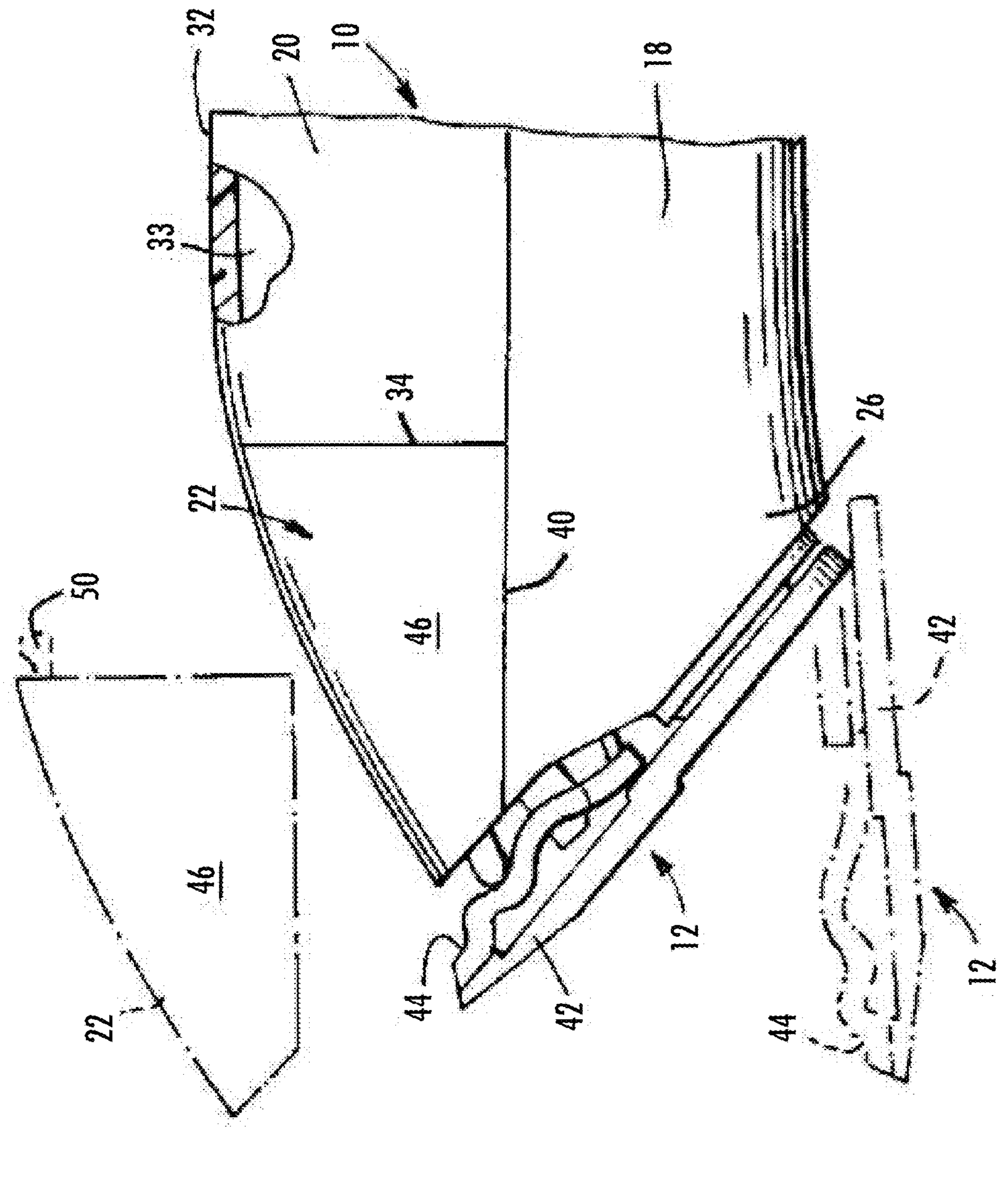
Prior Art FIG. 3
FIG. 3 is a side view of the hair clipper of FIG. 1 illustrating in dotted outline the removable drive cap, according to an exemplary embodiment.

As shown in FIG. 3, blade assembly 12 is hingedly connected to the forward end 26 of lower housing 18 or outer body 16 for movement between an operating position (FIGS. 3 and 4) and a retracted position, shown in dotted outline. The retracted position provides access to drive cap 22 and facilitates removal of drive cap 22. For example, pulling drive cap 22 away from upper housing 20 releases snap fasteners 50 and the joint slides along extensions 52 and protrusions 48. In this way, the retracted position of blade assembly 12 facilitates removal of drive cap 22 from hair clipper 10. The retracted position and removal of drive cap 22 enhances access to blade assembly 12 or drive assembly 14 for maintenance and/or cleaning. Any suitable mounting arrangement can be employed to couple blade assembly 12 to outer body 16. A portion of upper housing 20 is broken away to show the inner surface 33 of upper housing 20.

Figure 4:
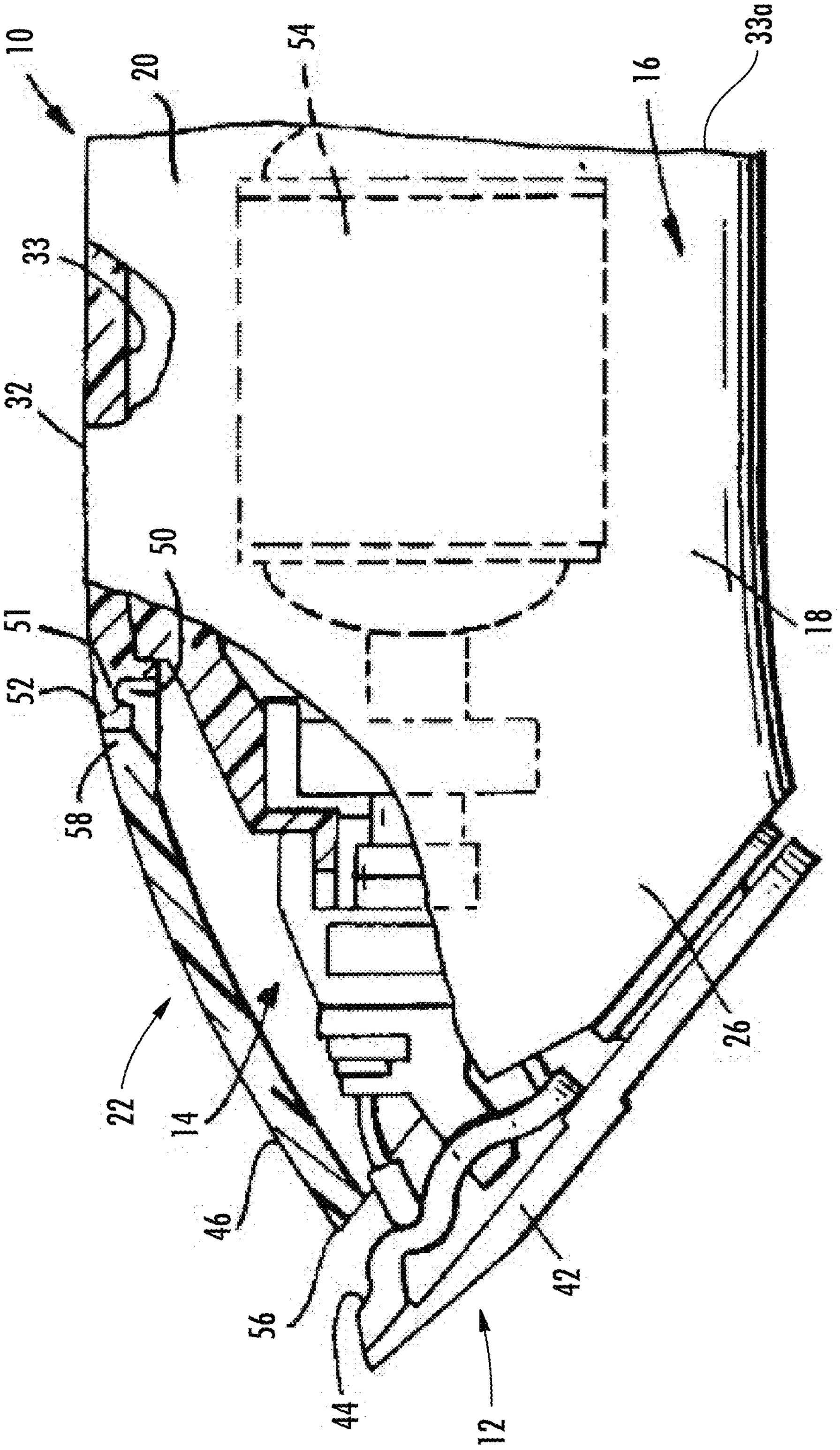
Prior Art FIG. 4
FIG. 4 is a side view of the clipper shown in FIG. 1 with portions broken away and in section.

As illustrated in FIGS. 2-4, blade assembly 12 includes a stationary blade 42 and a movable or translating cutting blade 44 which laterally reciprocates or oscillates relative to stationary blade 42 to cut hair. Cutting blade 44 is coupled to and driven by drive assembly 14, which interconnects cutting blade 44 to a drive motor 54 (FIG. 4). Any conventional blade assembly 12 which is compatible with drive assembly 14 can be employed. Drive assembly 14 is fixedly supported within the hollow interior of the outer body 16, e.g., by a pair of screws or adhesive. Drive assembly 14 operatively extends between a drive motor 54 and cutting blade 44 to reciprocate cutting blade 44 relative to stationary blade 42 in response to energization of motor 54. In some embodiments, motor 54 receives electrical energy from an electrical storage device (e.g., battery or electrical outlet) to oscillate at least one blade in blade assembly 12. In various embodiments, hair clipper 10 is either configured with a cord that plugs into an outlet or is cordless and contains a capacitor, battery, and/or other electrical storage device.

The forward end 34 of upper housing 20 terminates rearwardly of the forward end 26 of lower housing 18. Forward end segments 40 extend between the forward end 34 of upper housing 20 to blade assembly 12 and form a surface to join drive cap 22 to lower housing 18. Lower housing 18, upper housing 20, and/or drive cap 22 have one or more snap detents 51 and/or laterally extending forward edge portions or extensions 52 (FIG. 4). Extensions 52 join the forward ends 34 of the lateral edges 38 of upper housing 20 to drive cap 22. Extensions 52 join drive cap 22 to forward end segments 40 of lower housing 18. The forward termination of upper housing 20 provides access to drive assembly 14 for cleaning, lubrication, and replacement without requiring tools. Upper housing 20 terminates rearwardly of forward end 26 of lower housing 18, blade assembly 12, and drive assembly 14 to provide access to these components when removed.

Referring to FIG. 4, drive cap 22 extends forwardly from extension 52 on forward end 34 (FIG. 1) of upper housing 20. Drive cap 22 extends laterally between forward end segments 40 of lower housing 18. Drive cap 22 seamlessly couples to lateral edges 30 of lower housing 18 and forward end 34 of upper housing 20 to form outer body 16. For example, snap fasteners 50 extend from drive cap 22 and couple into snap detent 51 of upper housing 20. In another example, drive cap 22 couples to lower housing 18 and/or upper housing 20 with one or more snap fasteners 50 on inner surface 33 (e.g., an inner surface 33 of drive cap 22, lower housing 18, and/or upper housing 20) to snap detents 51 on an inner surface 33 (e.g., of lower housing 18, upper housing 20, and/or drive cap 22). Snap fasteners 50 can couple drive cap 22 to lower housing 18 and/or upper housing 20. Drive cap 22 provides a cover for the top of blade assembly 12 and extends rearwardly from blade assembly 12 to cover a portion of drive assembly 14. Drive cap 22 includes a forward edge 56 adjacent to blade assembly 12 and a rearward edge 58 adjacent to forward end 34 of upper housing 20. In some embodiments, each snap fastener 50 and each snap detent 51 is located on inner surfaces 33 of housings 18, 20, and/or drive cap 22. For example, no snap fasteners 50 or detents 51 are located on outer surfaces 24, 32, and/or 46 of lower/upper housing 18/20 and drive cap 22, respectively, are smooth.

Figure 5:
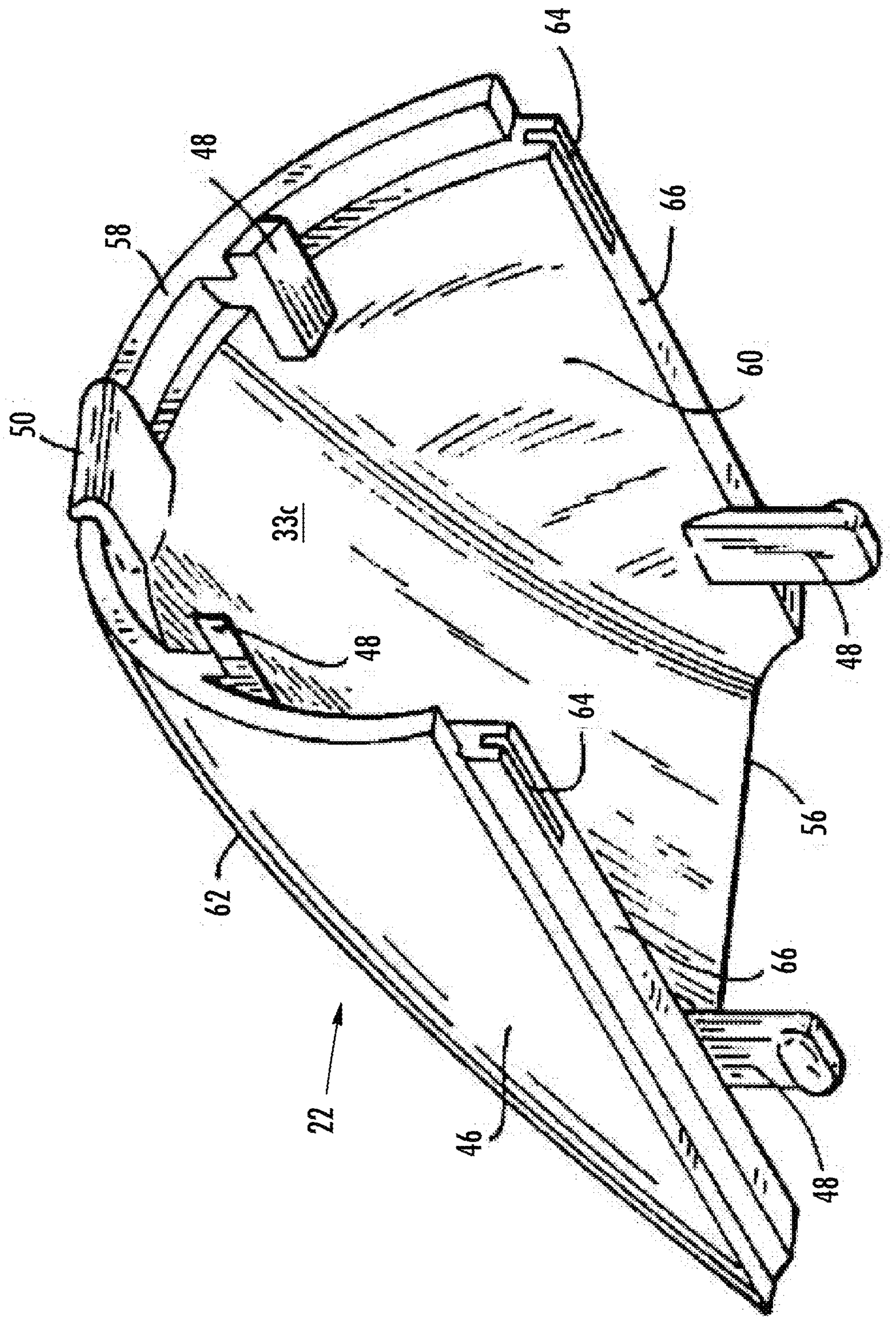
Prior Art FIG. 5
FIG. 5 is a perspective view of a drive cap, according to an exemplary embodiment.

With reference to FIG. 5, drive cap 22 includes an inner surface 33*c* or interior 60 and an exterior 62 which, when drive cap 22 is assembled on outer body 16, extends in smooth merging relation to outer surfaces 24 and 32 of lower and upper housings 18 and 20, respectively. Drive cap 22 includes a rearward edge 58 which is located adjacent to forward end segments 40 of upper housing 20 when outer body 16 is assembled (see FIG. 1). Drive cap 22 includes snap fasteners 50 to interconnect drive cap 22 with upper housing 20. One or more protrusions 48 extend from drive cap 22 to facilitate the alignment and joining of drive cap 22 to upper housing 20 and/or lower housing 18. One or more recesses 64 are formed in lateral edges 66 of drive cap 22. Lateral edges 66 join drive cap 22 to forward end segments 40 of lower housing 18. Recesses 64 in lateral edges 66 join with a lip projection on adjacent forward end segments 40 of lower housing 18.

Rearward edge 58 and lateral edges 66 of drive cap 22 couple to forward end 34 of upper housing 20 and forward end segments 40 of lower housing 18, respectively, to form outer body 16. Drive cap 22 includes a forward edge 56 located adjacent to blade assembly 12. Exterior 62 of drive cap 22 extends rearward from forward edge 56 and is rearwardly convergent and merges smoothly (without transitions) with outer surface 24 of lower housing 18 and outer surface 32 of upper housing 20 of outer body 16. For example, lower and upper housings 18 and 20 and drive cap 22 have outer surfaces 24, 32, and 46 that merge, such that when lower and upper housings 18 and 20 are coupled to drive cap 22, outer surfaces 24, 32, and/or 46 merge into a smooth exterior housing with curvilinear transitions (e.g., without acute or sharp angles).

Drive cap 22 and lower and upper housings 18 and 20 include resilient structures and/or cavities to secure drive cap 22. The resilient structures and cavities include protrusions 48, voids 49, snap fasteners 50, snap detents 51, extensions 52, slots 53, recesses 64, projections, and other structures or cavities to resiliently align and connect drive cap 22 in removable assembled relation to outer body 16. These structures enable an aligned coupling of drive cap 22 within outer body 16 so that exterior 62 of drive cap 22 blends smoothly with outer surfaces 24 and 32 of lower and upper housings 18 and 20. In addition, this configuration enables the non-destructive removal of drive cap 22 from outer body 16 without the use of tools. The removal of drive cap 22 facilitates access to drive assembly 14. For example, removal of drive cap 22 facilitates lubrication, cleaning, and/or replacement of drive assembly 14.

In addition, such structure includes, on lower housing 18, upper housing 20, and/or drive cap 22, laterally spaced guiding and supporting extensions 52 or projections. Drive cap 22 may include one or more protrusions 48. For example, a first protrusion 48 may extend downwardly or inwardly from laterally spaced lateral edges 66. When drive cap 22 is connected to outer body 16, protrusions 48 are releasably engaged under upper housing 20 and/or lower housing 18 to orient drive cap 22 with respect to outer body 16. Similarly, drive cap 22 may include slots 53 to receive extensions 52 and/or voids 49 to receive protrusions 48.

Upper housing 20 can include laterally spaced extensions 52 which extend forwardly beyond forward end 34 and from the underside or inside surface 33*b* of upper housing 20. In addition, drive cap 22 can include protrusions 48 which extend inwardly from inside surface 33*c* or interior 60. Protrusions 48 extend laterally outward in adjacent relation to voids 49, thereby assisting in laterally locating drive cap 22 in proper relation to upper housing 20 to form outer body 16.

In some embodiments, drive cap 22 is fabricated of the same plastic as is employed in lower and/or upper housings 18 and 20. For example, drive cap 22 is constructed from a plastic material that is thicker than the same plastic material used in lower and upper housings 18 and 20. The thickness and relatively short length of drive cap 22 and the otherwise non-semi-circular construction of drive cap 22, as compared to lower and upper housing 18 and 20, is such that drive cap 22 is resilient as compared to lower and upper housing 18 and 20. In a specific embodiment, drive cap 22 and lower and upper housings 18 and 20 each comprise the same material, and drive cap 22 has a thickness that is greater than a maximum thickness of either lower or upper housing 18 or 20. In this embodiment, drive cap 22 may be the same or a different material than lower and/or upper housings 18 and/or 20.

In other embodiments, drive cap 22 is a different material and/or a thicker material to make drive cap 22 more resilient to fracture relative to lower and upper housings 18 and 20. For example, drive cap 22 is made from a resilient thermoset polymer material and lower and/or upper housings 18 and 20 are formed from a thermoplastic material. In other embodiments, drive cap 22 is constructed from a thermoplastic and lower and/or upper housings 18 and 20 are formed from a thermoset material.

In use, when access to drive assembly 14 is desired for cleaning, lubrication, or replacement, drive cap 22 can be removed by manually manipulating the cover or drive cap 22 to release snap fasteners 50 located within snap detents 51. In this way, the user can move drive cap 22 upwardly and away from lower housing 18 and forwardly from upper housing 20 without the use of a tool. Hinged connection of blade assembly 12 to outer body 16, as described in reference to FIG. 3, facilitates manual removal of drive cap 22 from outer body 16. For example, blade assembly 12 is hingedly coupled to lower or upper housing 18 or 20 and releasably rotated from an operating position to a retracted position. More particularly, displacement of blade assembly 12 to the retracted position, as shown in the dotted lines of FIG. 3, enables improved grasp of drive cap 22 and facilitates manual removal from outer body 16. In other words, the retracted position provides access to inner surface 33*c* of drive cap 22.

Figure 6:
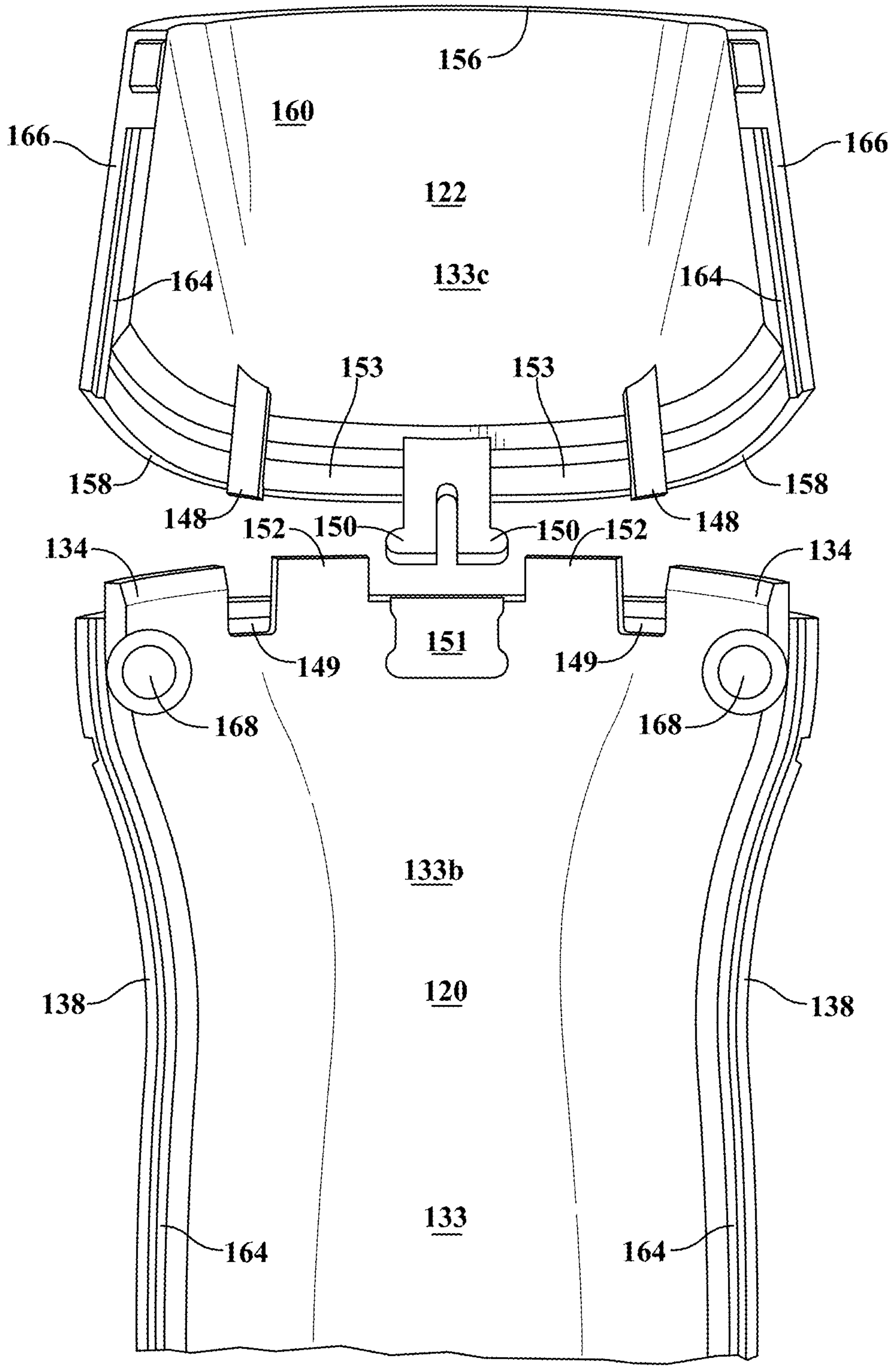
FIG. 6 is a view from the bottom of the disconnected drive cap and upper housing, wherein the two components are separated.
Figure 7:
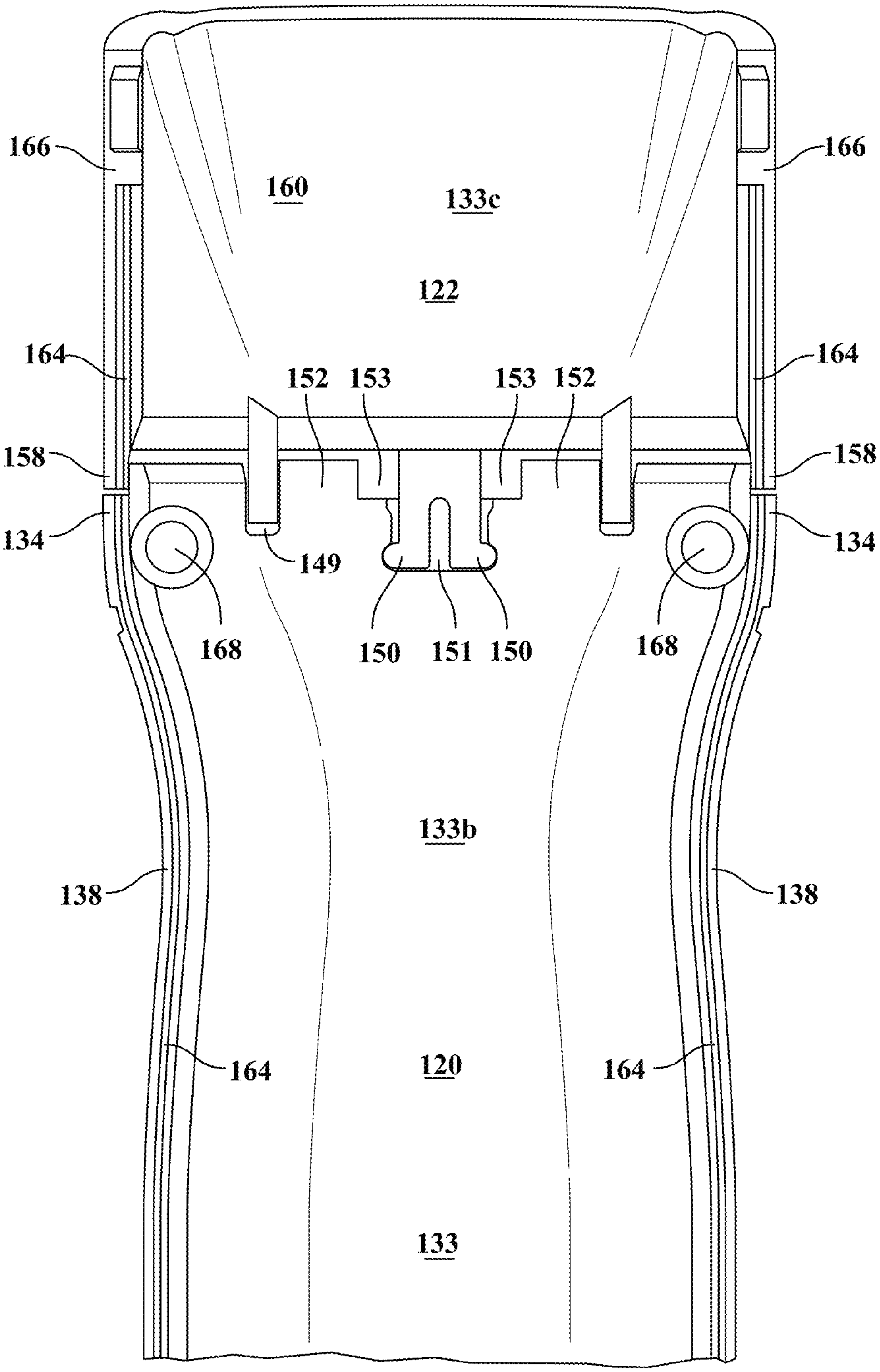
FIG. 7 is a view from the bottom of the connected drive cap and upper housing, wherein the two components are coupled with a snap fastener.
Figure 8:
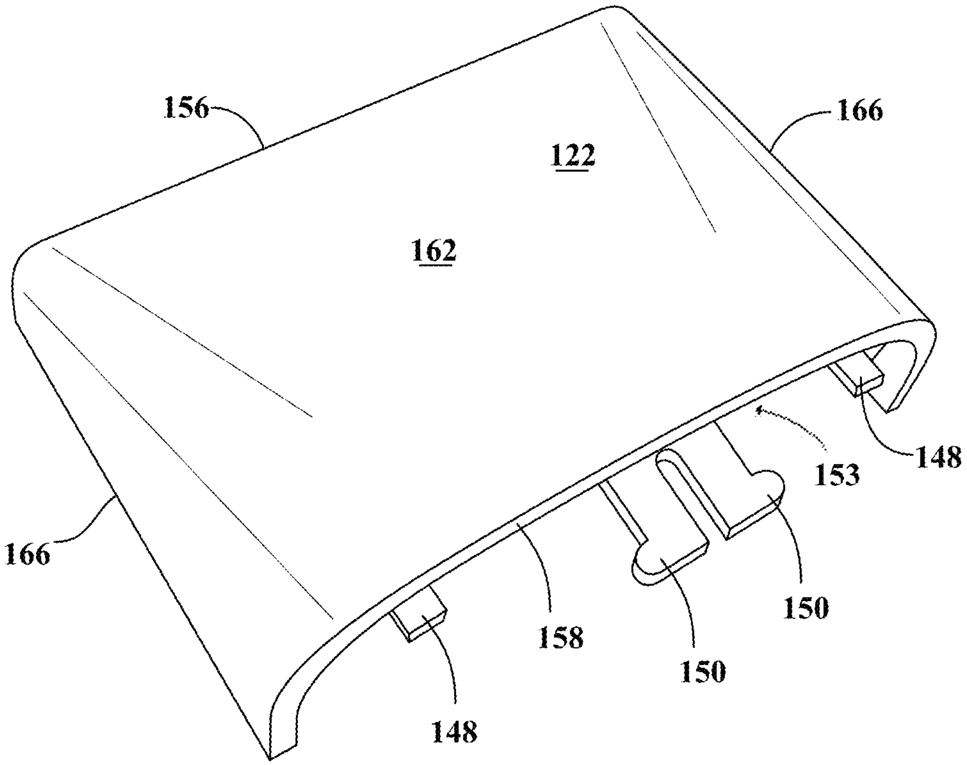
FIG. 8 is an isolated perspective view of the drive cap of FIGS. 6-7, according to an exemplary embodiment.

With reference to FIGS. 6-8, drive cap 122 includes a snap fastener 150 that couples to a snap detent 151 in upper housing 120. For example, one of upper housing 120 and drive cap 122 has snap fastener 150 on inner surface 133 (e.g., inner surface 133*b* on upper housing 120 or inner surface 133*c* on drive cap 122) and the other of upper housing 120 and drive cap 122 has snap detent 151 on its inner surface 133. Snap fastener 150 and snap detent 151 on inner surfaces 133*b* and 133*c* cooperate to releasably couple upper housing 120 to drive cap 122. In addition, upper housing 120 may include one or more extensions 152 configured to align with slots 153 in drive cap 122 to orient drive cap 122 with respect to upper housing 120. Drive cap 122 can include one or more protrusions 148 configured to align with voids 149 in upper housing 120 to orient drive cap 122 with respect to upper housing 120. As illustrated, drive cap 122 couples to upper housing 120 with various snap fasteners 150 and snap detents 151. Similar coupling techniques can be used to join drive cap 122 to forward end segments (see e.g., 40) of a lower housing, such as lower housing 18.

As illustrated in FIG. 6, drive cap 122 is illustrated detached from upper housing 120. The interior 160 of drive cap 122 includes one or more snap fasteners 150 configured to couple with a snap detent 151 in upper housing 120. In some embodiments, upper housing 120 has one or more snap fasteners 150 configured to couple with a snap detent 151 in drive cap 122. Upper housing 120 has one or more extensions 152 configured to couple with one or more surfaces or slots 153 on the rearward edge 158 of drive cap 122. Similarly, drive cap 122 may have one or more protrusions 148 configured to couple with one or more surfaces or voids 149 of the forward end 134 of upper housing 120. Thus, the forward end 134 of upper housing 120 couples to the rearward edge 158 of drive cap 122.

Upper housing 120 and drive cap 122 may have a mating recess 164 about lateral edges 166 configured to receive a lower housing such as lower housing 18. Edges 138 of upper housing 120 and lateral edges 166 of drive cap 122 may form a continuous recess 164 so that the lower housing can form a continuous lip projection to couple to upper housing 120 and drive cap 122.

One or more fastener holes 168 in upper housing 120 may be configured to receive fasteners from lower housing to join the lower housings and upper housing 120 and form outer body, such as outer body 16. Drive cap 122 then slides into upper housing 120. When snap fasteners 150 are received in lower and/or upper housing 120, drive cap 122 completes the outer body. In addition, the various protrusions 148 and/or extensions 152 on lower housing, upper housing 120, and drive cap 122 ensure that the parts are correctly aligned and held firmly in place (e.g., hermetically seal) when snap fastener 150 secures into snap detent 151. For example, extensions 152 align and/or couple with slots 153 on drive cap 122 to couple drive cap 122 to upper housing 120. Similarly, protrusions 148 align and/or couple with voids 149 on upper housing 120 to couple and/or fluidly seal drive cap 122 seamlessly onto upper housing 120. For example, a fluid seal may prevent air, water, or other fluids from entering the hollow interior of outer body 16. The seal may be hermetic and/or fluid to make clippers, such as clippers 10 that are, e.g., water resistant. Similar protrusions 148, voids 149, snap fasteners 150, snap detents 151, extensions 152, and/or slots 153 are envisioned for forward end segments (see e.g., 40) of the lower housing.

FIG. 7 illustrates drive cap 122 coupled to upper housing 120 and joined by snap fasteners 150. Snap fasteners 150 enable secure non-permanent coupling of drive cap 122 and upper housing 120 with a smooth finish. Because no screws are used to couple upper housing 120 to drive cap 122, the exterior surface along the outer body, such as outer body 16 appears to have a smooth finish without any transitions. The joint is secured by protrusions 148, snap fasteners 150, and/or extensions 152, but is not permanently joined. A user can remove drive cap 122 from upper housing 120 to clean, for example, a motor, such as motor 54 and/or other components.

FIG. 8 illustrates an isolated drive cap 122. From this perspective, exterior 162 of drive cap 122 is visible. Snap fasteners 150 are visible from the rearward edge 158 of drive cap 122. Protrusions 148 couple to voids 149 in upper housing 120 to help stabilize the joint and align drive cap 122 with respect to upper housing 120. Extensions 152 on upper housing 120 couple with slots 153 to further stabilize and orient drive cap 122. The rearward edge 158 of drive cap 122 couples to the forward end 134 of upper housing 120. Lateral edges 166 of drive cap 122 couple to the forward end segments of the lower housing to complete the outer body. In some embodiments, lower and upper housings 120 and/or drive cap 122 are non-permanently joined by snap fasteners 150 coupled to snap detents 151, protrusions 148 coupled to voids 149, and extensions 152 coupled to slots 153, such that lower and upper housings 120, and drive cap 122 have no permanent joints to each other and are releasably coupled.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A hair clipper, comprising:
a housing comprising:
a lower housing portion;
an upper housing portion coupled to the lower housing portion, the upper housing portion comprising:
an interior surface;
a snap detent positioned on the interior surface; and
two voids formed in a forward edge of the upper housing portion;
a drive assembly supported within the housing;
a blade assembly coupled to the drive assembly, the drive assembly comprising:
an outer blade; and
an inner blade supported relative to the outer blade; and
a drive cap configured to couple to the upper housing portion, the drive cap comprising:
an interior surface;
a snap fastener positioned on and extending from the interior surface of the drive cap, the snap fastener couples to the snap detent of the upper housing portion; and
protrusions extending from the interior surface of the drive cap, the protrusions extending into the upper housing portion and configured to interface with the upper housing portion.

2. The hair clipper of claim 1, wherein the protrusions of the drive cap comprise two protrusions.

3. The hair clipper of claim 2, wherein the two protrusions are received within the two voids of the upper housing portion.

4. The hair clipper of claim 1, the upper housing portion further comprising extensions extending toward the drive cap.

5. The hair clipper of claim 4, wherein the extensions extend outward from the forward edge of the upper housing portion.

6. The hair clipper of claim 5, wherein extensions of the upper housing portion comprise two extensions and wherein the two extensions are positioned on opposing sides of the snap detent.

7. The hair clipper of claim 4, the drive cap further comprising a rear edge, the rear edge facing the forward edge of the upper housing portion.

8. The hair clipper of claim 7, wherein slots are defined within the rear edge of the drive cap, the slots positioned to receive the extensions of the upper housing portion.

9. The hair clipper of claim 1, wherein the drive cap has a thickness that is greater than a maximum thickness of the upper housing portion and the lower housing portion.

10. A hair clipper, comprising:
a drive assembly;
a blade assembly, comprising:
a lower blade;
an upper blade coupled to the drive assembly; and
a housing surrounding the drive assembly, the housing comprising:
an upper housing comprising:
an interior surface;
extensions positioned on the interior surface of the upper housing;
a lateral edge; and
a mating recess adjacent to the lateral edge; and
a lower housing, wherein the mating recess receives a portion of the lower housing to couple the upper housing to the lower housing; and
a drive cap comprising:
an interior surface;
slots formed within the interior surface of the drive cap;
wherein the extensions on the upper housing couple to the slots of the drive cap to seal the drive cap onto the upper housing.

11. The hair clipper of claim 10, further comprising protrusions on the interior surface of the drive cap to couple with voids formed within a forward edge of the upper housing.

12. The hair clipper of claim 10, wherein one of the upper housing and the drive cap includes a snap fastener on the interior surface thereof and the other of the upper housing and the drive cap includes a snap detent on the interior surface thereof such that the snap fastener and the snap detent releasably couple the upper housing to the drive cap.

13. The hair clipper of claim 10, the drive cap further comprising:
a second lateral edge; and
a mating recess adjacent to the second lateral edge, the mating recess of the drive cap aligned with the mating recess of the upper housing forming a continuous recess such that a continuous lip projection of the lower housing is couplable to the upper housing and the drive cap.

14. The hair clipper of claim 10, wherein the drive cap comprises a plastic material, and wherein the plastic material is more resilient to fracture than a material used to construct the upper housing or the lower housing.

15. A housing for a hair clipper comprising:
an upper housing comprising:
an interior surface;
an exterior surface;
a snap detent on the interior surface of the upper housing; and
voids formed within a forward edge of the upper housing;
a lower housing coupled to the upper housing, the lower housing comprising:
an interior surface; and
an exterior surface, the lower housing coupled to the upper housing; and a drive cap configured to partially surround a drive assembly of the hair clipper, the drive cap comprising:
an interior surface;
an exterior surface;
a snap fastener on the interior surface of the drive cap; and
protrusions on the interior surface of the drive cap, the protrusions extending beyond a rearward edge of the drive cap;
wherein the snap fastener and the snap detent releasably couple the drive cap to the upper housing; and
wherein, when the housing is assembled, the protrusions are configured to align with the voids of the upper housing such that the voids receive the protrusions to seal the drive cap onto the upper housing.

16. The housing for the hair clipper of claim 15, wherein the forward edge of the upper housing includes one or more extensions configured to engage with one or more slots formed within the drive cap.

17. The housing for the hair clipper of claim 16, wherein the drive cap and the upper housing are non-permanently joined by the snap fastener coupled to the snap detent, the protrusions coupled to the voids, and the extensions coupled to the slots, wherein the drive cap, the upper housing, and the lower housing include no permanent joints to each other and are releasably coupled.

18. The housing for the hair clipper of claim 15, the upper housing further comprising:
a lateral edge; and
a mating recess adjacent to the lateral edge, wherein the mating recess receives a portion of the lower housing to couple the upper housing to the lower housing.

19. The housing for the hair clipper of claim 18, the drive cap further comprising:
a second lateral edge; and
a mating recess adjacent to the second lateral edge, the mating recess of the drive cap aligned with the mating recess of the upper housing forming a continuous recess such that a continuous lip projection of the lower housing is couplable to the upper housing and the drive cap.

* * * * *